United States Patent
Singh et al.

(10) Patent No.: US 8,839,370 B2
(45) Date of Patent: *Sep. 16, 2014

(54) RESTRICTING ACCESS TO HARDWARE FOR WHICH A DRIVER IS INSTALLED ON A COMPUTER

(71) Applicant: Research In Motion Limited, Waterloo (CA)

(72) Inventors: Ravi Singh, Toronto (CA); Neil Patrick Adams, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 5 days.

This patent is subject to a terminal disclaimer.

(21) Appl. No.: 13/716,467

(22) Filed: Dec. 17, 2012

(65) Prior Publication Data

US 2013/0104196 A1     Apr. 25, 2013

Related U.S. Application Data

(63) Continuation of application No. 11/687,243, filed on Mar. 16, 2007, now Pat. No. 8,347,354.

(51) Int. Cl.
| | | |
|---|---|---|
| G06F 7/04 | (2006.01) | |
| H04W 12/08 | (2009.01) | |
| H04L 29/06 | (2006.01) | |
| G06F 21/62 | (2013.01) | |
| H04W 88/02 | (2009.01) | |

(52) U.S. Cl.
CPC ............. *H04W 12/08* (2013.01); *H04W 88/02* (2013.01); *H04L 63/101* (2013.01); *G06F 21/6209* (2013.01); *G06F 2221/2141* (2013.01)

USPC ........ 726/3; 726/2; 726/19; 726/22; 713/154; 709/223; 709/224; 235/441

(58) Field of Classification Search
CPC . G06F 2221/2141; G06F 21/50; G06F 21/52; H04L 63/10; H04L 63/101; G06K 7/0008; G06Q 20/32; H04M 2250/02; H04W 12/08
USPC ............... 726/3, 19, 22, 2; 713/154; 709/223, 709/224; 235/441
See application file for complete search history.

(56) References Cited

U.S. PATENT DOCUMENTS

| 5,659,798 A | 8/1997 | Blumrich et al. |
| 5,910,987 A | 6/1999 | Ginter et al. |

(Continued)

OTHER PUBLICATIONS

Jansen (Assigning and Enforcing Security Policies on Handheld Devices, Proceedings of the Canadian Information Technology Security Symposium, May 2002).*

(Continued)

*Primary Examiner* — Brian Shaw
(74) *Attorney, Agent, or Firm* — Integral Intellectual Property Inc.; Miriam Paton

(57) ABSTRACT

Users of a computer are prevented from directly accessing certain hardware for which a driver is installed on the computer. The users are provided a limited, indirect manner to access the hardware for a specific purpose or to do a specific job. One example of such hardware is a wireless hardware communication interface. The wireless activity of the computer may be restricted so that the wireless hardware communication interface is prevented from communicating with any devices compatible with the wireless hardware communication interface other than one or more specific devices.

20 Claims, 2 Drawing Sheets

(56) References Cited

U.S. PATENT DOCUMENTS

| | | | |
|---|---|---|---|
| 7,925,666 B1* | 4/2011 | Johnson et al. | 707/781 |
| 2002/0143921 A1 | 10/2002 | Stephan | |
| 2003/0142631 A1 | 7/2003 | Silvester | |
| 2003/0179244 A1 | 9/2003 | Erlingsson | |
| 2003/0183691 A1* | 10/2003 | Lahteenmaki et al. | 235/441 |
| 2003/0220940 A1 | 11/2003 | Futoransky et al. | |
| 2004/0199763 A1* | 10/2004 | Freund | 713/154 |
| 2005/0140964 A1 | 6/2005 | Eschenauer et al. | |
| 2005/0246723 A1 | 11/2005 | Bhesania | |
| 2006/0253859 A1 | 11/2006 | Dai et al. | |
| 2007/0038743 A1 | 2/2007 | Hellhake et al. | |
| 2008/0005261 A1* | 1/2008 | Adams et al. | 709/217 |
| 2012/0017272 A1* | 1/2012 | Little et al. | 726/19 |

OTHER PUBLICATIONS

Phillips_2005 (Phillips UM_1SPP, Dec. 2005).*

Palm (2004) Access 6 Bluetooth; Retrieved from http://www.accessdevnet.com/docs/palmos/PalmOSCompanion2/BTCompanion.html#1017862 Oct. 20, 2010.

Arbutina, Ljiljana , Second Exam Report for EP 07104365.7, Jul. 28, 2009.

Arbutina, Ljiljana , Third Exam Report for EP 07104365.7, Dec. 7, 2010.

Arbutina, Ljiljana , Extended European Search Report for EP 07104365.7, Aug. 22, 2007.

Matar, G , First Office Action for CA 2,626,541, Dec. 14, 2010.

Swift, Michael M. et al., "Improving the granularity of Access Control in Windows NT", 2001.

Yeow, Leslie , Second Office Action for CA 2,626,541, Jul. 9, 2012.

Zhang, Guangsen et al., Context-aware Dynamic Access Control for Pervasive Applications, Dec. 31, 2004.

Chhim, S., Third Office Action for CA2626541, Mar. 13, 2014.

* cited by examiner

RESTRICTING ACCESS TO HARDWARE FOR WHICH A DRIVER IS INSTALLED ON A COMPUTER

BACKGROUND

Wireless communication technology provides a way for a wide range of computers and other electronic devices to communicate with each other without the need for wires, cables and connectors. Unfortunately, wireless communication technology also forms a potential security hazard since wireless communication signals can be monitored and a wireless interface of an electronic device can be used to access the electronic device.

Bluetooth® (BT) is one example of wireless communication technology. Bluetooth® is an industrial standard for short-range wireless communications using radio frequency (RF) data transmission. BT technology uses the portion of the RF spectrum near the 2.4 GHz frequency that is reserved for industrial, scientific and medical devices. BT-enabled devices are able to communicate without wires over an air-interface of up to 100 feet. BT is increasingly taking the place of direct communications links between computers and peripheral devices, such as printers, keyboards and mice. Additionally, BT may be used for other communication purposes, such as communication between electronic devices.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

In embodiments of the present invention, users of a computer are prevented from directly accessing certain hardware for which a driver is installed on the computer. The users are provided a limited, indirect manner to access the hardware for a specific purpose or to do a specific job.

One example of such hardware is a wireless hardware communication interface. The wireless activity of the computer may be restricted so that the wireless hardware communication interface is prevented from communicating with any devices compatible with the wireless hardware communication interface other than one or more specific devices.

Although the following description uses Bluetooth® communications as an example, embodiments of the invention are applicable to other wireless communications, including other wireless personal area network (WPAN) communication technologies. ZigBee™ and ultra wideband (UWB) are non-limiting examples of other WPAN communication technologies.

Figure 1:
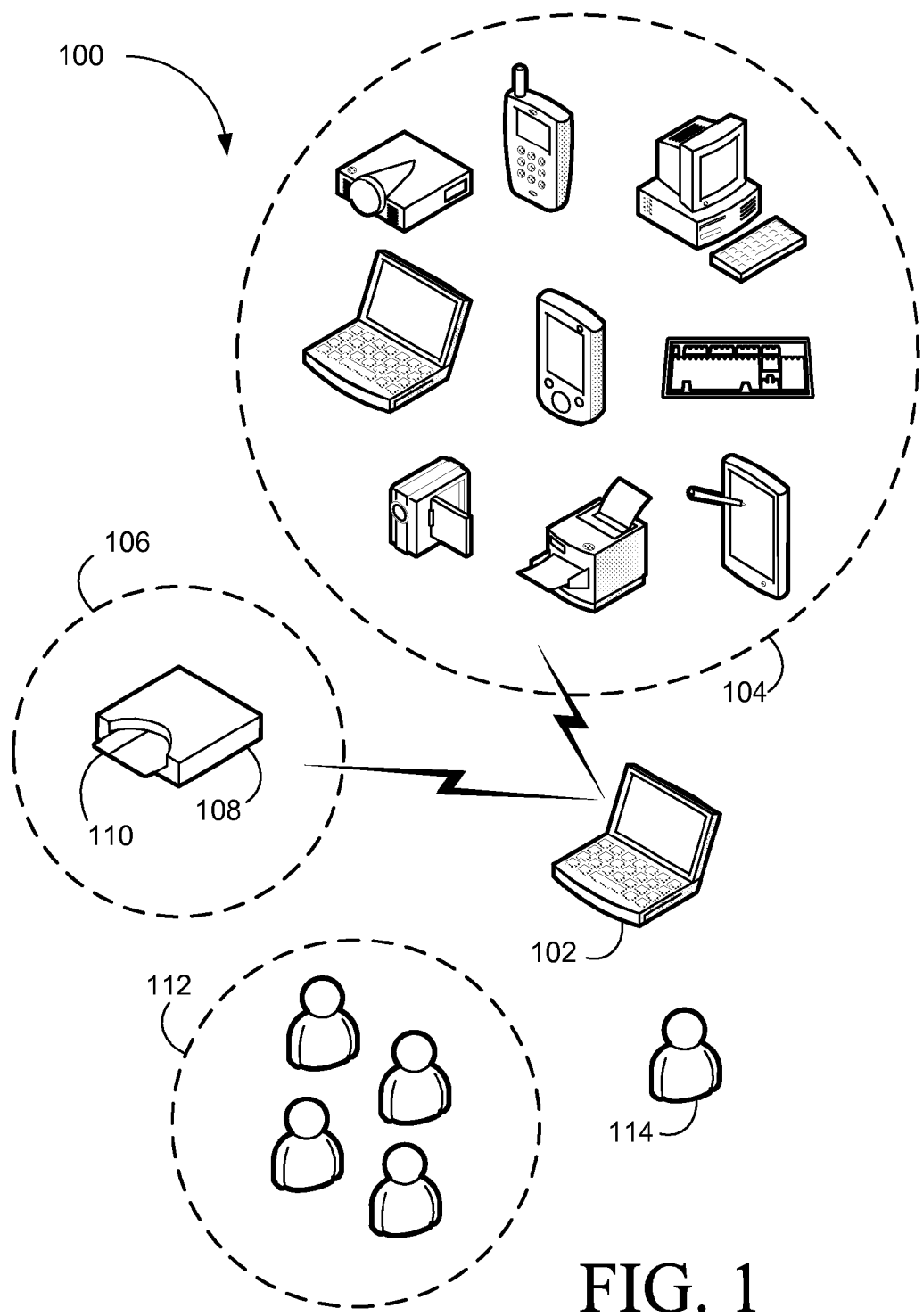
FIG. 1 is a schematic diagram of an exemplary communication environment.

FIG. 1 is a schematic diagram of an exemplary communication environment 100 that comprises a computer 102. Computer 102 may be BT-enabled, i.e. it may comprise the internal or external software and hardware necessary for communicating with other BT-enabled devices. Alternatively, computer 102 may be potentially BT-enabled, i.e. it may be possible to make it BT-enabled by modifying it and/or by attaching it to a BT-enabled device.

In this description and claims, the term "computer" is used inclusively to mean any electronic device having an operating system. This includes, for example, personal computers, server computers, client computers, laptops, notebooks, personal digital assistants (PDAs), pocket personal computers, smartphones, email devices, and the like.

For security reasons or for any other reason, it may be desirable to enable computer 102 to communicate using BT communication with BT-enabled devices of a group 106 while preventing computer 102 from communicating using BT communication with any other BT-enabled devices, including the devices of a group 104.

As known in the art, peripheral devices that authenticate a user's identity may be used to enhance security for a computer. One example of such an authentication device is a smart card and smart card reader combination. Smart cards are devices that are compatible with personal authentication protocols as defined by the ISO7816 standard and its derivatives, published by the International Organization for Standardization. A smart card resembles a credit card in size and shape, but also comprises a memory, and a microprocessor and/or dedicated logic. The smart card owner's identity and other personal information may be stored in the smart card's memory, access to which is controlled by the microprocessor and/or dedicated logic. The smart card may prevent unauthorized access to its memory by requiring that a secret such as a personal identification number (PIN) be supplied before allowing the access to proceed. Smart cards may be inserted into a smart card reader that is in communication with a computer over a wireless communication link. The computer may communicate with the smart card via the smart card reader and may use the smart card and information stored in the smart card for different purposes. For example, the smart card may authenticate a user to the computer, may enable unlocking and booting the computer and may be used for encryption and decryption of information used by applications on the computer.

In one non-limiting example, group 106 comprises a BT-enabled smart card reader 108 (shown with a smart card 110 inserted). It may be desirable for computer 102 to communicate with smart card reader 108 for security purposes, and it may be desirable for security reasons to prevent computer 102 from communicating with any other device using BT technology. Of course, there may be many other reasons to enable computer 102 to communicate with only a selected group of one or more BT enabled devices, and the devices in such a group may be of any type.

The restrictions on wireless activity in the computer may be applied to a specific group of users of computer 102, for example, to a group 112 of users. Others, for example, a system administrator 114, may be exempt from the restrictions. System administrator 114 may be able to configure computer 102 so that the restrictions are imposed on the users of group 112. The users of group 112 may be prevented from modifying the restrictions.

Figure 2:
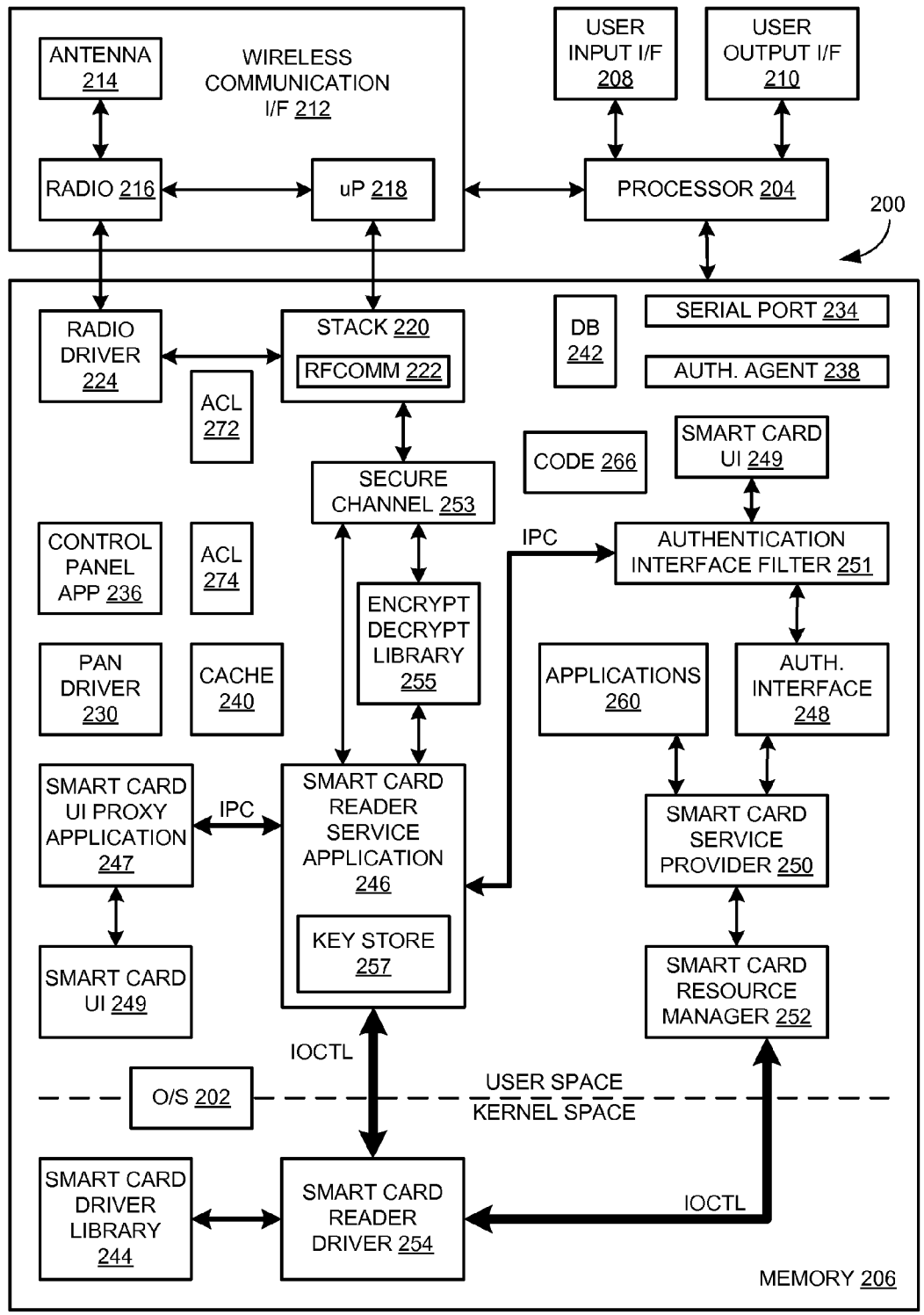
FIG. 2 is a functional block diagram of a computer.

FIG. 2 is a functional block diagram of a computer 200 that is an example for computer 102. In the following description, computer 200 is described as adapted to run a Microsoft® operating system 202 such as Windows® XP or Windows® Vista®. Embodiments of the invention are, however, applicable to computers that are adapted to run any other operating system. It should be obvious to a skilled person how to modify the description for implementation with any operating system.

Computer 200 comprises a processor 204 and a memory 206 coupled to processor 204. Computer 200 comprises a user input interface 208, a user output interface 210 and a wireless communication interface 212, all coupled to processor 204. Wireless communication interface 212 comprises an antenna 214 and a radio 216 and may optionally comprise a microprocessor (µP) 218. Radio 216 is a wireless hardware communication interface the use of which is restricted according to the methods described herein. Alternatively, radio 216 is a software-defined radio, comprising a programmable wireless hardware communication interface the use of which is restricted according to the methods described herein, and comprising software that controls the programmable hardware. Memory 206 stores a radio driver 224 to control radio 216 or the hardware portion thereof. For simplicity, the following description and claims refer to a radio as a wireless hardware communication interface.

Memory 206 stores a communication stack 220 compatible with a wireless communication standard, for example, Bluetooth®. Stack 220 may be executable by processor 204. Alternatively, portions of stack 220 may be executable by processor 204 and the other portions may be executable by microprocessor 218. For example, portions of stack 220 that are defined below the HCI (Host Control Interface) layer may be executable by microprocessors 218. Stack 220 may comprise an RFCOMM (Radio Frequency Communication) module 222 to emulate serial ports for use with communications via radio 216.

Memory 206 may store one or more serial port definitions 234, and an application 236 for communicating control information related to the wireless communications with a user through interfaces 208 and interfaces 210. In Microsoft® operating systems, application 236 for BT communications is typically found with the following pathname "%WINDIR%\System32\bthprops.cpl", where "%WINDIR%" indicates the directory where the operating system files are installed.

Memory 206 may also store an authentication agent 238 to interact with a user through interfaces 208 and 210, to report to the user that a device is attempting to connect to computer 200 using radio 216, and to receive from the user permission or refusal for the request for connection. Memory 206 may also store a cache 240. Cache 240 may store information about previous BT pairings of computer 200 with other BT-enabled devices. This information may comprise, for example, one or more BT encryption keys, one or more BT device addresses, and/or one or more BT device names. More generally, cache 240 may store encryption keys previously used to encrypt communications conducted via radio 216.

Memory 206 stores a database 242 for operating system 202 that comprises entries having information, settings and options for software applications and drivers of hardware devices that are installed in computer 200. In Microsoft® Windows® operating systems, for example, database 242 is known as the registry. Some entries comprise ClassGUID parameters that characterize classes to which the installed drivers of hardware devices belong. For example, drivers of BT-enabled hardware devices such as radios are characterized in Microsoft® Windows® using the ClassGUID {e0cbf06c-cd8b-4647-bb8a-263b43f0f974}.

Computer 200 is described, for the purpose of a non-limiting example, as adapted to communicate with a BT-enabled smart card reader, such as smart card reader 108. Memory 206 may therefore store a smart card driver library 244 that resides in kernel space and that comprises a set of routines that standardize most of the functions that a smart card reader driver must perform, and a smart card reader driver 254 that resides in kernel space and accesses routines of smart card driver library 244. Memory 206 may store a smart card resource manager 252 that communicates with smart card reader driver 254 via input/output control (IOCTL) calls, a smart card service provider (SCSP) 250 that provides access to smart card capabilities, and an authentication interface 248 that performs identification and authentication user interactions. In Windows® XP, for example, authentication interface 248 is compatible with a Graphical Identification and Authentication (GINA) model, and in Windows® Vista®, for example, authentication interface 248 is compatible with a Credential Provider model. More detail about how these software components work together is provided hereinbelow.

Restricting Access to a Radio Driver

As known in the art, one or more users are able to use a computer by setting up accounts. Accounts are associated with security contexts. An administrator account, assigned to a system administrator of the computer, has more privileges than a user account. A system account, able to be assigned to certain processes running on the computer, also has more privileges than a user account. Applications run by a user who has logged on to the computer, and any processes started by those applications, will inherit the security context of the user's user account.

In one embodiment, restricting wireless activity of computer 200 is achieved by preventing any process running on computer 200 under any user account from directly accessing radio driver 224. Since access to radio driver 224 is essential for using radio 216, use of radio 216 for communications is restricted. Likewise, since access to radio driver 224 is essential for altering the configuration for the wireless communications and for using any of the wireless communication functionality, those activities are also restricted. This is explained in more detail as those activities are discussed hereinbelow.

For example, access to radio driver 224 may be controlled via an access control list (ACL) 272 that permits only administrative accounts and system accounts to access radio driver 224. As known in the art, an ACL is a list of permissions attached to an object. The list specifies who or what is allowed to access the object and what operations are allowed to be performed on the object. When a subject requests to perform an operation on an object, the operating system first checks the ACL for an applicable entry in order to decide whether or not to proceed with the operation.

If drivers of two or more radios for the same type of wireless communications are installed in computer 200, ACL 272, once applied, may affect all such radio drivers 224, since operating system 202 may apply ACL 272 to all drivers for devices of a certain class. In Microsoft® Windows® operating systems, for example, BT radio drivers all have the same class ID. In addition, if a new radio is installed after ACL 272 is already activated, operating system 202 may install a new radio driver and may automatically apply ACL 272 to the new radio driver. Consequently, applying ACL 272 ensures that wireless functionality will be restricted even for wireless hardware communication interfaces that are not yet installed in computer 200. Furthermore, applying ACL 272 ensures that the restriction cannot be altered in the future by processes running under a user account.

Limited, indirect access to radio 216 is provided to the user as follows. Memory 206 stores a smart card reader service application (SCR SA) 246 which acts as a middle man between smart card reader driver 254 and smart card reader 108. SCR SA 246 communicates with smart card reader driver 254 via IOCTL calls. As part of its functionality, SCR SA 246 manages all of the wireless communication with smart card reader 108. When installed on computer 200, SCR SA 246 is configured to run under a system account every time that operating system 202 is running Since ACL 272 permits system accounts to access radio driver 224, SCR SA 246 is able to conduct wireless communications with smart card reader 108 via radio 216 to access smart card 110.

Memory 206 also stores a smart card user interface (UI) proxy application 247 that communicates with SCR SA 246 via inter-process communication (IPC), for example, named pipes. Smart card UI proxy application 247 delegates UI requests to a smart card UI library 249, which shows all of the UI. Smart card UI proxy application 247 is started when a user logs onto computer 200 (and is stopped when the user logs off), and provides UI for SCR SA 246. Since smart card UI proxy application 247 is run under a user account, it is prevented by ACL 272 from directly accessing radio driver 224. However, using IPC, smart card UI proxy application 247 sends commands to SCR SA 246, which is able to directly access radio driver 224 and therefore conduct wireless communications with smart card reader 108 via radio 216 to access smart card 110.

The indirect access to radio 216 provided to the user in this fashion is limited, because SCR SA 246 has specific functions that it performs in order to do a specific job. The result is that the user can use radio 216 to communicate with smart card reader 108 but is prevented from using radio 216 to communicate with any other devices compatible with radio 216. Instead of smart card UI proxy application 247, any other process accessible to the user that is able to send commands via IPC to SCR SA 246 may be used. For example, authentication interface 248 (via authentication interface filter 251), which is run under the system account, is able to send commands via IPC to SCR SA 246, and may be used to provide indirect access to radio 216 to the user. It will be obvious to persons of ordinary skill in the art how to modify the embodiments described herein to restrict use of a wireless hardware communication interface to communications with one or more specific devices, none of which are necessarily a smart card reader.

Restricting Access to an RFCOMM Module

ACL 272 may also be applied to RFCOMM module 222, thus preventing any process running on computer 200 under any user account from directly accessing RFCOMM module 222. SCR SA 246, which runs under a system account, is permitted to directly access RFCOMM module 222, and indirect access to RFCOMM module 222 is provided to the user via smart card UI proxy application 247, as described hereinabove with respect to radio driver 224. As explained hereinabove, RFCOMM module 222 is used to emulate serial ports for use in communications via radio 216. Without the ability to emulate serial ports, communication via radio 216 is blocked to processes running under a user account.

Communications with the Smart Card Reader

The interaction of the various software components to enable wireless communications between computer 200 and smart card reader 108 will now be described.

1) A user runs smart card US proxy application 247 or authentication interface 248 and indicates a desire to have computer 200 connect to a smart card reader. These applications communicate with SCR SA 246 via IPC to inform SCR SA 246 that the user wants to connect to a smart card reader. Communications between SCR SA 246 and authentication interface 248 are conducted via an authentication interface filter 251, which catches function calls made to authentication interface 248 and is able to change their behavior.

2) If the user is not logged into computer 200, or is at a lock screen, SCR SA 246 communicates to authentication interface 248 to tell it to display a window that the user can enter the address of smart card reader 108. If the user is logged in, SCR SA 246 communicates to smart card UI proxy application 247 to tell it to display the same window.

3) The user types in an identifier of smart card reader 108, for example, its BT device address or a device name. This identifier is transferred to SCR SA 246 via IPC, which then communicates with BT radio driver 224 to start pairing with the identified reader. Communication between SCR SA 246 and BT radio driver 224 is conducted via stack 220, and communication between SCR SA 246 and stack 220 is conducted via a secure channel module 253 stored in memory 206. Secure channel module 253 provides a protocol to establish a session key during secure pairing as well as a secure communication channel thereafter. A library 255 stored in memory 206 provides encryption and decryption functionality for use by the secure channel.

4) If smart card reader 108 and computer 200 have not previously paired, or have previously paired but cache 240 has been erased, then SCR SA 246 will negotiate with smart card reader 108 to determine whether they already have a BT pairing key and if not, will take the appropriate steps to establish a BT pairing key.

5) If smart card reader 108 and computer 200 do not already have a shared secure pairing key, SCR SA 246 and smart card reader 108 will negotiate whether a secure pairing key is needed, and if so, will take the appropriate steps to establish a secure pairing key. SCR SA 246 comprises a key store 257 to store the secure pairing key and any other keys generated for securing wireless communications with smart card reader 108.

6) Once pairing has completed, SCR SA 246 communicates with smart card reader driver 254 via IOCTL calls to inform it of events such as a card being inserted or removed. SCR SA 246 receives this information from smart card reader 108 via the BT communications. Smart card reader driver 254 then communicates this information via smart card resource manager 252 to SCSP 250, which will then relay the information to any applications 260 which may be interested in accessing smart card 110. For example, an email application may wish to decrypt an email using a private key stored on smart card 110.

When any of applications 260 wishes to send a command to smart card 110, it sends the command via SCSP 250 to smart card resource manager 252, which will then communicate it to smart card reader driver 254, which will in turn relay the command to SCR SA 246, which will then communicate the command to smart card reader 108 over the BT communication link.

In addition to restricting access to radio driver 224, or in addition to restricting access to radio driver 224 and to RFCOMM module 222, other actions may be taken to restrict the wireless communication functionality of computer 200. These actions may be performed by executing code 266, which is stored in memory 206. Any suitable format for code 266 is acceptable. For example, code 266 may be an executable program that must be run under an administrator account. If it is run under a user account, the program will information the user that it is not running in administrator mode and quit without performing further action. The program may accept a single command line argument, either "-lock" or "-unlock". If the program is run with the "-lock" option, it restricts the use of the hardware. To remove the restrictions, the program is run with the "-unlock" option.

For example, running the program with the "-lock" option may place ACL 272 on radio driver 224 and RFCOMM module 222, and running the program with the "-unlock" option may remove ACL 272.

Disabling Discoverability and/or Connectability

The typical operational mode of a BT-enabled device is to be connected to other Bluetooth® devices (for example, in a piconet) and exchanging data with that BT-enabled device. As BT is an ad-hoc wireless communications technology there are also a number of operational procedures that enable piconets to be formed so that the subsequent communications can take place. BT-enabled devices use the inquiry procedure to discover nearby devices, or to be discovered by devices in their locality. The inquiry procedure is asymmetrical. A BT-enabled device that tries to find other nearby devices is known as an inquiring device and actively sends inquiry requests. BT-enabled devices that are available to be found are known as discoverable devices and listen for these inquiry requests and send responses.

In order to discover other devices, an inquiring device, such as any of the devices in group 104, enters the inquiry substate. In this substate, it repeatedly transmits inquiry messages at different hop frequencies. With respect to inquiry, a BT-enabled device such as computer 200 may be either in non-discoverable mode or in a discoverable mode. A discoverable device that allows itself to be discovered (i.e. in a discoverable mode), regularly enters the inquiry scan substate to detect inquiry messages. If an inquiry message is detected, the device may optionally enter the inquiry response substate to respond to the inquiry messages. When a device is in non-discoverable mode it does not respond to inquiries and never enters the inquiry response state. During the inquiry substate, the inquiring device collects the BT device addresses of all discoverable devices that respond to the inquiry messages. It can then, if desired, make a connection to any one of them by means of the page procedure.

Page procedure, the procedure for forming connections is asymmetrical and requires that one BT-enabled device carries out the page (connection) procedure while the other BT-enabled device is connectable (page scanning) The procedure is targeted by use of a BT device address, so that the page procedure is responded to only by one specified BT-enabled device. The device carrying out the page (connection) procedure enters the page substate and repeatedly transmits paging messages. The device that is connectable enters the page scan substate and listens to paging messages. If a page message is successfully received by the connectable device, the connectable device enters the slave response substate and transmits a reply to the device that carries out the page (connection) procedure. If the response is successfully received by the device that carries out the page (connection) procedure it may enter the master response substate to complete forming the connection.

BT connectability and discoverability of computer 200 are handled by BT stack 220. Being in a discoverable mode and/or being connectable may impose potential security threats on computer 200. In discoverable mode, BT stack 220 may cause computer 200 to advertise its existence by transmitting inquiry responses, and if computer 200 is connectable, stack 220 may cause computer 200 to advertise its existence by replies to paging messages or by paging other devices. Moreover, if computer 200 can be in discoverable mode and can be connectable, BT stack 220 may cause computer 200 to accept an incoming request to connect to another BT-enabled device.

To reduce security risks, computer 200 may be prevented from being in discoverable mode and/or may prevent computer 200 from being connectable. A scan_enable parameter of BT stack 220 that is defined by the BT specifications may be modified to disable inquiry scans and to disable page scans. Running the program for code 266 with the "-lock" option may directly modify the scan_enable parameter using the Write_scan_enable command defined by the BT specifications. Alternatively, running the program for code 266 with the "-lock" option may modify a Write_scan_enable parameter of an appropriate entry in database 242, so that operating system 202 modifies the scan_enable parameter of BT stack 220. In order to determine which entry corresponds to BT radio 216, code 266 may examine ClassGUID entries of database 242. In Microsoft® operating systems, Write_scan_enable parameters may have the following form: "HKEY_LOCAL_MACHINE\SYSTEM\CurrentControl Set\Enum\USB\Vid_XXXX&PidYYYY\ ZZZZZZZZZZZZZZ\DeviceParameters\Write Scan Enable", where XXXX, YYYY and ZZZZZZZZZZZZZZ are variable.

Other methods may be used to prevent computer 200 from being connectable and/or from being in discoverable mode.

Preventing Authentication of Paging Devices

In general, use of authentication agent 238 may be toggled on and off by any user of computer 200. In Microsoft® Windows® operating systems, for example, toggling of a BT authentication agent can be accomplished by changing Control Panel→Bluetooth →Options→"Alert me when a new Bluetooth device wants to connect". If it is turned on, a command is sent to BT radio driver 224 which adds an entry to database 242 having the following form:
"HKEY_LOCAL_MACHINE\SOFTWARE\Microsoft\
Windows\CurrentVersion\Run\Bluetooth Authentica-
tionAgent".
This entry starts BT authentication agent 238 the next time the user logs in.

Authentication agent 238 is used to alert users of computer 200 that a device is attempting to connect with computer 200 using wireless communications via radio 216. If authentication agent 238 recognizes such an attempt, it may alert the user via user output interface 210 and may prompt the user to provide permission or to deny the incoming connection via user input interface 208.

Running the program for code 266 with the "-lock" option may disable authentication agent 238. If a user cannot interact with authentication agent 238, computer 200 may be prevented from completing a connection with a device that has attempted to connect using wireless communications via radio 216 to computer 200. Code 266 may be able to disable BT authentication agent 238, for example, by removing the entry of database 242 that was added when the setting was turned on.

Even if BT authentication agent 238 is not disabled, ACL 272 prevents processes running under a user account from enabling BT discoverability and connectability and/or from allowing incoming connections, because the toggling of the BT authentication agent requires access to BT radio driver 224, which is blocked by ACL 272.

Removing Pairing Information

Running the program for code 266 with the "-lock" option may be able to remove information that is stored in cache 240, including, but not limited to, one or more encryption keys that were previously used to encrypt communications conducted via radio 216. In the case of a BT pairing cache 240, the information removed may include, for example, one or more BT pairing keys, one or more BT encryption keys, one or more BT device addresses, and/or one or more BT device names.

Disabling Existing Bluetooth® Serial Ports

In general, a user of computer 200 can add BT serial ports 234. In Microsoft® Windows® operating systems, for example, this can be accomplished via Control Panel→Bluetooth→COM Ports→Add. Typically, COM ports for BT are added or removed via the BT control panel, which in turn communicates with BT radio drivers 224, which in turn change or add or remove the ports.

Running the program for code 266 with the "-lock" option may programmatically disable existing serial ports 234 by making calls to operating system 202 requesting it to disable the serial ports. Once disabled, processes running under user accounts may not be able to enable serial ports 234 due to the restrictions on radio drivers 224 implemented via ACL 272.

Running the program for code 266 with the "-unlock" option may programmatically enable existing serial ports 234 by making calls to operating system 202 requesting it to enable the serial ports.

Disabling Bluetooth® Personal Area Networks

In general, if operating system 202, being run under an administrator account, detects that a new BT radio 216 has been installed in computer 200, operating system 202 may typically install an additional BT personal area network (PAN) driver 230 if it receives permission to do so from system administrator 114. Operating system 202 will not install BT PAN driver 230 under user accounts 258.

Running the program for code 266 with the "-lock" option may disable or remove existing BT PAN drivers 230 by calling a function which tells operating system 202 to disable or remove the BT PAN drivers. Likewise, running the program for code 266 with the "-unlock" option may enable disabled BT PAN drivers 230 by calling a different function which tells operating system 202 to enable the BT PAN drivers.

Preventing Access to Bluetooth® Files

Memory 206 may store various files related to the wireless communication standard with which radio 216 is compatible. In the case of BT, for example, memory 206 may store BT control panel application 236, BT library function modules (not shown), a BT file transfer application (not shown), and BT API (not shown). Running the program for code 266 with the "-lock" option may place an ACL 274 on the files, where the ACL 274 permits only administrative accounts and system accounts to access the files. BT control panel application 236, for example, may include libraries needed for using BT stack 220, and therefore it is not desirable to remove it entirely. Running the program for code 266 with the "-unlock" option may remove ACL 274.

It should be noted that to bypass ACL 274, one might try to copy any of the files from another computer to memory 206, since ACL 274 applies only to the specific files as originally found on computer 200. However, the BT file transfer application and BT control panel application 236 need to send commands to BT radio drivers 224, which are locked by ACL 272. Therefore, new copies of such files will not give processes run under a user account access to any of BT radios 216.

Resetting Computer or Stopping and Restarting BT Radios

Rebooting computer 200 will cause the changes described hereinabove to take effect. Alternatively, code 266 may stop and restart any radios 216 so that the changes described hereinabove can take effect immediately without rebooting computer 200. Code 266 may stop and restart any radios 216 both upon locking and unlocking Computer-executable instructions for execution of the above-described method may be stored on a form of computer readable media. Computer readable media includes volatile and nonvolatile, removable and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired instructions and which can be accessed by computer 200, including by the Internet or other computer network forms of access.

A non-exhaustive list of examples for antenna 214 includes dipole antennae, monopole antennae, multilayer ceramic antennae, planar inverted-F antennae, loop antennae, slot antennae, dual antennae, omnidirectional antennae and any other suitable antennae.

A non-exhaustive list of examples for processors 204 and 218 includes a central processing unit (CPU), a digital signal processor (DSP), a reduced instruction set computer (RISC), a complex instruction set computer (CISC) and the like. Furthermore, processors 204 and 218 may be part of application specific integrated circuits (ASICs) or may be a part of application specific standard products (ASSPs).

A non-exhaustive list of examples for user input interface 208 includes a touch screen, a keyboard, a track ball, a microphone, and the like. A non-exhaustive list of examples for user output interface 210 includes a display, a touch screen, a speaker, and the like.

A non-exhaustive list of examples for memory 206 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for restricting wireless activity by user accounts in a computer having a wireless hardware communication interface, the method comprising:

running a system-account process designed to communicate via the wireless hardware communication interface solely with a particular group of one or more wireless devices, the system-account process configured to receive inter-process commands from any user-account process;
applying an access control list (ACL) that is configured to permit only administrative accounts and system accounts to have direct access to a software element installed on the computer, thus preventing any user-account process from directly accessing the software element, where access to the software element is essential to support communication via the wireless hardware communication interface; and
running a user-account process that sends commands via inter-process communication to the system-account process, wherein providing the user-account process with indirect access to the software element to support communications via the wireless hardware communication interface solely with the particular group of one or more wireless devices occurs responsive to the running a system-account process, the applying an access control list, and the running a user-account process.

2. The method of claim 1, wherein the software element comprises a radio driver for a radio in the wireless hardware communication interface.

3. The method of claim 1, wherein the software element comprises a radio frequency communication module that is designed to emulate in the computer a serial port for use in wireless communications via the wireless hardware communication interface.

4. The method of claim 1, wherein one of the particular group of one or more wireless devices is a smart card reader and the system-account process is designed to communicate with the smart card reader to access a smart card coupled to the smart card reader.

5. The method of claim 1, further comprising:
disabling an authentication agent that provides an alert when a device is attempting to connect to the computer using the wireless hardware communications interface.

6. The method of claim 1, further comprising:
deleting one or more encryption keys stored in a cache of the computer, wherein the one or more encryption keys were previously used to encrypt wireless communications conducted via the wireless hardware communication interface.

7. The method of claim 1, further comprising:
programmatically disabling a serial port defined in the computer for wireless communications via the wireless hardware communication interface.

8. The method of claim 1, wherein the wireless hardware communication interface is compatible with a wireless personal area network protocol.

9. The method of claim 8, wherein the wireless personal area network protocol comprises a Bluetooth® protocol.

10. The method of claim 8, further comprising:
preventing access by any user-account process to library function modules for the protocol.

11. The method of claim 8, further comprising:
preventing access by any user-account process to an application programming interface for the protocol.

12. The method of claim 8, further comprising:
preventing access by any user-account process to a file transfer application for the protocol.

13. A computer comprising:
a processor;
a wireless hardware communication interface; and
a memory coupled to the processor, the memory storing:
an operating system for the computer,
a software element access to which is essential to support communication via the wireless hardware communication interface,
an access control list that is configured to permit only administrative accounts and system accounts to have direct access to the software element, so that when the access control list is applied by the operating system, any user-account process is prevented from directly accessing the software element,
an application which when executed by the processor runs a system-account process designed to communicate via the wireless hardware communication interface solely with a particular group of one or more wireless devices, the system-account process configured to receive inter-process commands from any user-account process, and
an application which when executed by the processor runs a user-account process that sends commands via inter-process communication to the system-account process, wherein the user-account process gains indirect access to the software element to support communications via the wireless hardware communication interface solely with the particular group of one or more wireless devices responsive to execution of the system-account process, application of the access control list, and running of the user-account process.

14. The computer of claim 13, wherein the software element comprises a radio driver for a radio in the wireless hardware communication interface.

15. The computer of claim 13, wherein the software element comprises a radio frequency communication module that is designed to emulate in the computer a serial port for use in wireless communications via the wireless hardware communication interface.

16. The computer of claim 13, wherein one of the particular group of one or more wireless devices is a smart card reader and the system-account process is designed to communicate with the smart card reader to access a smart card coupled to the smart card reader.

17. The computer of claim 13, wherein the wireless hardware communication interface is compatible with a wireless personal area network protocol.

18. The computer of claim 17, wherein the wireless personal area network protocol comprises a Bluetooth® protocol.

19. The method of claim 1, wherein the wireless hardware communication interface is compatible with a short-range wireless communication protocol.

20. The computer of claim 13, wherein the wireless hardware communication interface is compatible with a short-range wireless communication protocol.

* * * * *